US011415775B2

(12) United States Patent
Wei et al.

(10) Patent No.: US 11,415,775 B2
(45) Date of Patent: Aug. 16, 2022

(54) ULTRA-WIDE-ANGLE LENS INCLUDING SIX LENSES OF --++-+ REFRACTIVE POWERS, OR SEVEN LENSES OF --++-++ OR ---+-++ REFRACTIVE POWERS

(71) Applicant: JIANGXI LIANCHUANG ELECTRONIC CO., LTD., Nanchang (CN)

(72) Inventors: Wenzhe Wei, Nanchang (CN); Xuming Liu, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 298 days.

(21) Appl. No.: 16/494,312

(22) PCT Filed: Jul. 24, 2019

(86) PCT No.: PCT/CN2019/097555
§ 371 (c)(1),
(2) Date: Sep. 16, 2019

(87) PCT Pub. No.: WO2020/098305
PCT Pub. Date: May 22, 2020

(65) Prior Publication Data
US 2021/0333510 A1     Oct. 28, 2021

(30) Foreign Application Priority Data
Nov. 12, 2018   (CN) .......................... 201811340957.5

(51) Int. Cl.
*G02B 13/00*     (2006.01)
*G02B 9/34*      (2006.01)
(Continued)

(52) U.S. Cl.
CPC ............. *G02B 13/004* (2013.01); *G02B 9/34* (2013.01); *G02B 9/62* (2013.01); *G02B 9/64* (2013.01);
(Continued)

(58) Field of Classification Search
CPC .............................. G02B 13/0045; G02B 9/64
See application file for complete search history.

(56) References Cited

U.S. PATENT DOCUMENTS

2007/0201143 A1    8/2007   Kohno et al.
2009/0251801 A1*  10/2009  Jung .................. G02B 13/0045
                                                              359/708
(Continued)

FOREIGN PATENT DOCUMENTS

CN          1576942 A      2/2005
CN        101042465 A      9/2007
(Continued)

OTHER PUBLICATIONS

International Search Report issued in corresponding international application No. PCT/CN2019/097555, dated Oct. 15, 2019 (8 pages).

(Continued)

*Primary Examiner* — Wen Huang

(57) ABSTRACT

The disclosure provides an ultra-wide-angle lens. From an object side to an imaging surface, the ultra-wide-angle lens sequentially includes a first group with a negative refractive power, a second group with a positive refractive power, a stop, a third group with a positive refractive power or negative refractive power, a fourth group with a positive refractive power and filter. The first group includes at least one negative refractive power lens, the second group sequentially includes a negative refractive power lens and a positive refractive power lens. The third group includes a (Continued)

positive refractive power lens and a negative refractive power lens, the positive refractive power lens of the third group and the negative refractive power lens of the third group being bonded together to form an integrated body. The fourth group includes at least one positive refractive power lens.

16 Claims, 11 Drawing Sheets

(51) Int. Cl.
    *G02B 9/62*         (2006.01)
    *G02B 9/64*         (2006.01)
    *G02B 13/06*       (2006.01)

(52) U.S. Cl.
    CPC ....... *G02B 13/006* (2013.01); *G02B 13/0045* (2013.01); *G02B 13/06* (2013.01)

(56) References Cited

U.S. PATENT DOCUMENTS

| | | | |
|---|---|---|---|
| 2017/0108673 A1* | 4/2017 | Ichikawa | G02B 5/005 |
| 2017/0184815 A1* | 6/2017 | Wang | G02B 13/006 |
| 2017/0285299 A1* | 10/2017 | Chen | G02B 9/64 |
| 2017/0315330 A1* | 11/2017 | Chiu | G02B 9/12 |
| 2018/0039049 A1* | 2/2018 | Lee | G02B 13/0065 |
| 2018/0143411 A1* | 5/2018 | Minefuji | G02B 9/64 |
| 2019/0346662 A1* | 11/2019 | Kim | G02B 9/64 |
| 2020/0341246 A1* | 10/2020 | Machida | G02B 13/06 |

FOREIGN PATENT DOCUMENTS

| | | | | |
|---|---|---|---|---|
| CN | 102466869 A | | 5/2012 | |
| CN | 102540426 A | | 7/2012 | |
| CN | 103197406 A | | 7/2013 | |
| CN | 105008978 A | | 10/2015 | |
| CN | 105556368 A | | 5/2016 | |
| CN | 108519660 A | | 9/2016 | |
| CN | 106133579 A | | 11/2016 | |
| CN | 108490584 A | | 9/2018 | |
| CN | 109521549 A | | 3/2019 | |
| JP | S62173415 A | | 7/1987 | |
| JP | 2004085979 A | | 3/2004 | |
| JP | 2009271165 A | * | 11/2009 | ..... G02B 15/144511 |

OTHER PUBLICATIONS

First Notification of an Office Action issued in corresponding Chinese application No. 201811340957.5, dated Nov. 20, 2019 (14 pages).
Written opinion of International Search Report issued in corresponding International application No. PCT/CN2019/097555, dated Oct. 15, 2019 (6 pages).

* cited by examiner

ULTRA-WIDE-ANGLE LENS INCLUDING SIX LENSES OF --++-+ REFRACTIVE POWERS, OR SEVEN LENSES OF --++-++ OR ---+-++ REFRACTIVE POWERS

This application claims priority to a Chinese application No. 201811340957,5 filed on Nov. 12, 2018, titled "ULTRA-WIDE-ANGLE LENS". The entirety of the above-mentioned application is hereby incorporated by reference herein.

TECHNIQUE FIELD

The present disclosure relates to the field of optical lens technologies, and more particularly, to an ultra-wide-angle lens.

BACKGROUND

Autonomous vehicle technology has special requirements for vehicle-mounted camera lenses. For example, it requires no dead angle monitoring around the car, strong light-passing ability, ability to adapt to the light and dark changes of the external environment, meanwhile, the lens is required to have good resolution to objects that emit or reflect different monochromatic lights, such as traffic lights, highway sips, etc., to meet high requirements of autonomous vehicle systems. Therefore, it is imperative to develop a high-performance optical lens that can be cooperated with unmanned driving.

SUMMARY

The present disclosure aims to provide an ultra-wide-angle lens having at least the advantages of wide field angles and a large aperture.

In order to achieve the aim, the technical solution of the present disclosure is described as follows.

An ultra-wide-angle lens, from the object side to an imaging surface thereof, the ultra-wide-angle lens sequentially includes: a first group with a negative refractive power, a second group with a positive refractive power, a stop, a third group with a positive refractive power or a negative refractive power, a fourth group with a positive refractive power and filter. The first group includes at least one negative refractive power lens, the second group sequentially includes a negative refractive power lens and a positive refractive power lens, an image side surface of the negative refractive power lens of the second group is a concave surface an object side surface and an image side surface of the positive refractive power lens of the second group each are convex surfaces. The third group includes a positive refractive power lens and a negative refractive power lens, the positive refractive power lens of the third group and the negative refractive power lens of the third group are bonded together to form an integrated body The fourth group includes at least one positive refractive power lens.

Compared with the related art, the disclosure provide the ultra-wide-angle lens with the characteristics of wide field angle and large aperture, the first group is mainly used for light collection and distortion correction, and the second group is mainly used for light convergence, the third group is used to eliminate the effect of chromatic aberration, while the second group and the third group are composed of two positive refractive power lenses and a negative refractive power lens, which can effectively reduce the aberration of the lens. The fourth group can play the role of eliminating aberrations and controlling the exit angle of the chief ray.

Figure 1:
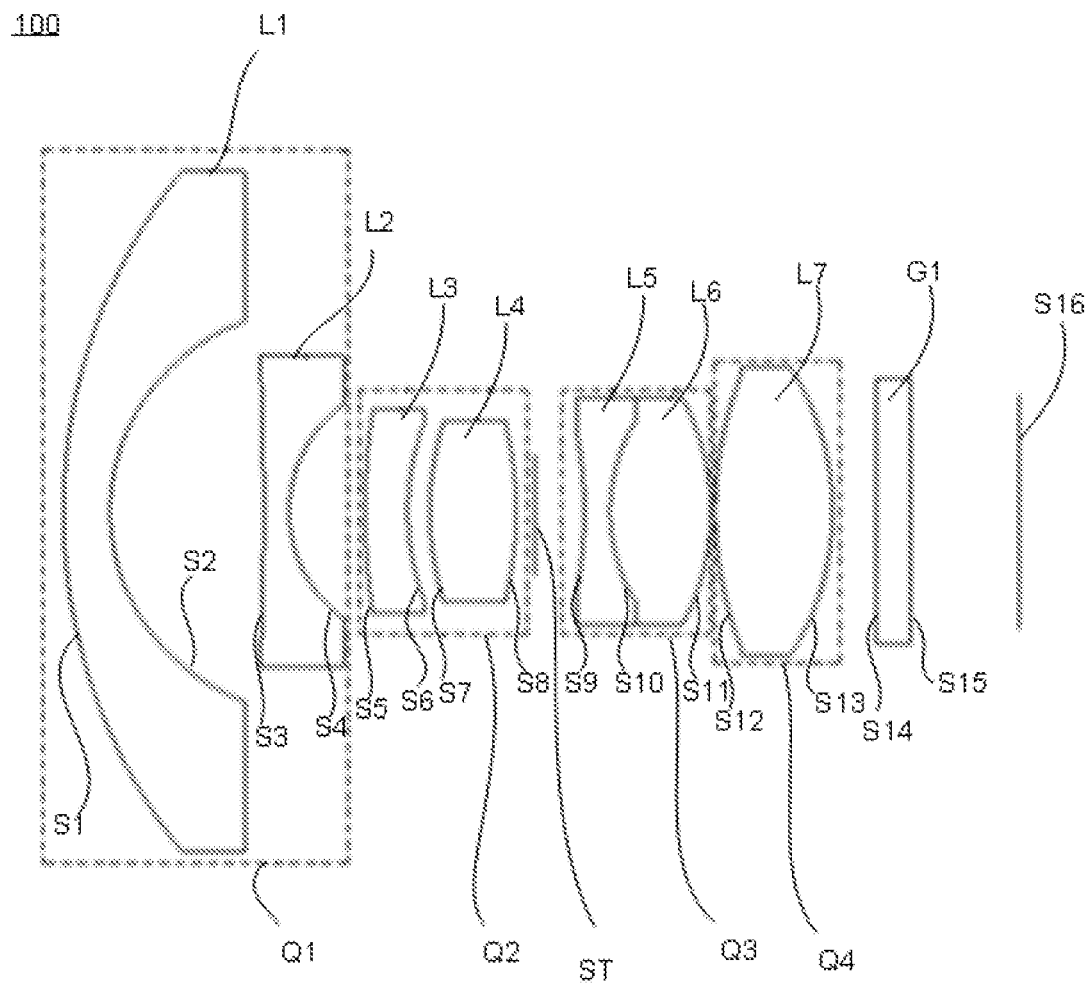
FIG. 1 is a schematic cross-sectional view of the ultra-wide-angle lens according to the first embodiment of the present disclosure.
Figure 2:
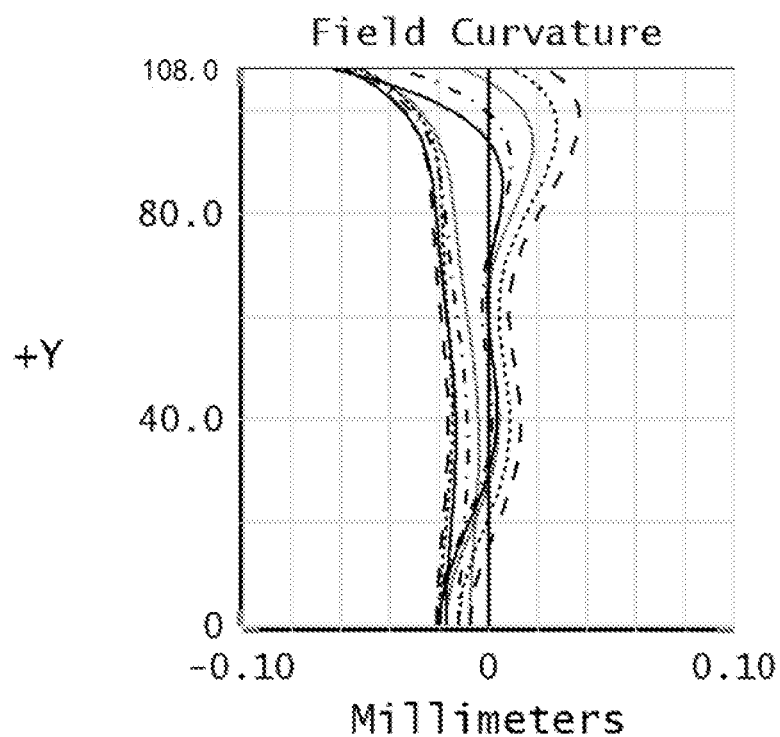
FIG. 2 is a field curvature diagram of the ultra-wide-angle lens according to the first embodiment of the present disclosure.
Figure 3:
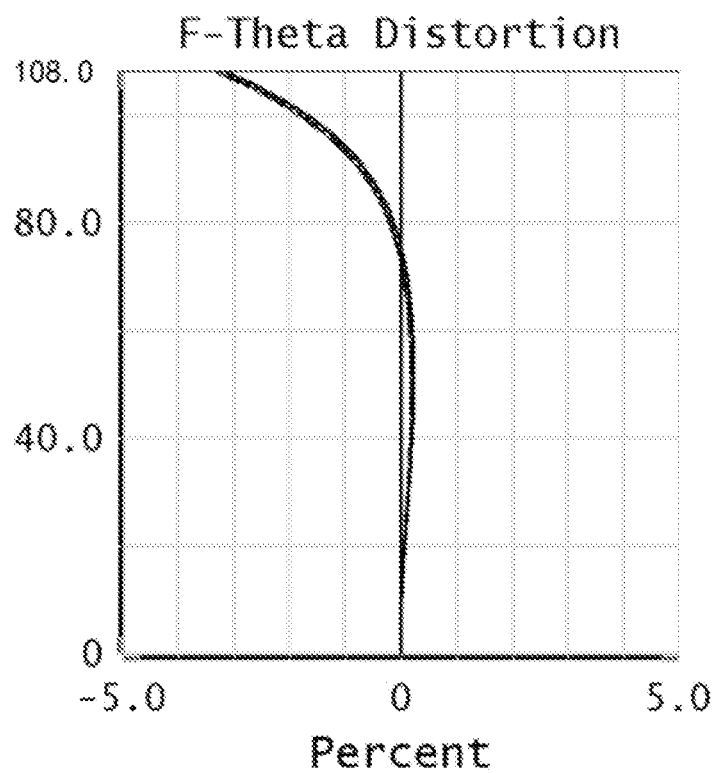
FIG. 3 is a distortion diagram of the ultra-wide-angle lens according to the first embodiment of the present disclosure.
Figure 4:
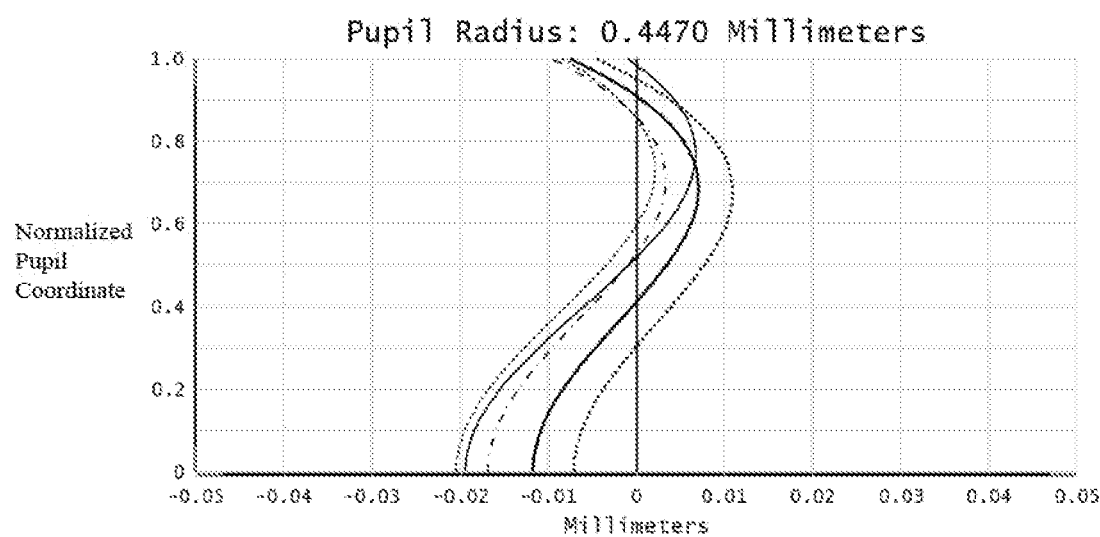
FIG. 4 is an axial chromatic aberration diagram of the ultra-wide-angle lens according to the first embodiment of the present disclosure.
Figure 5:
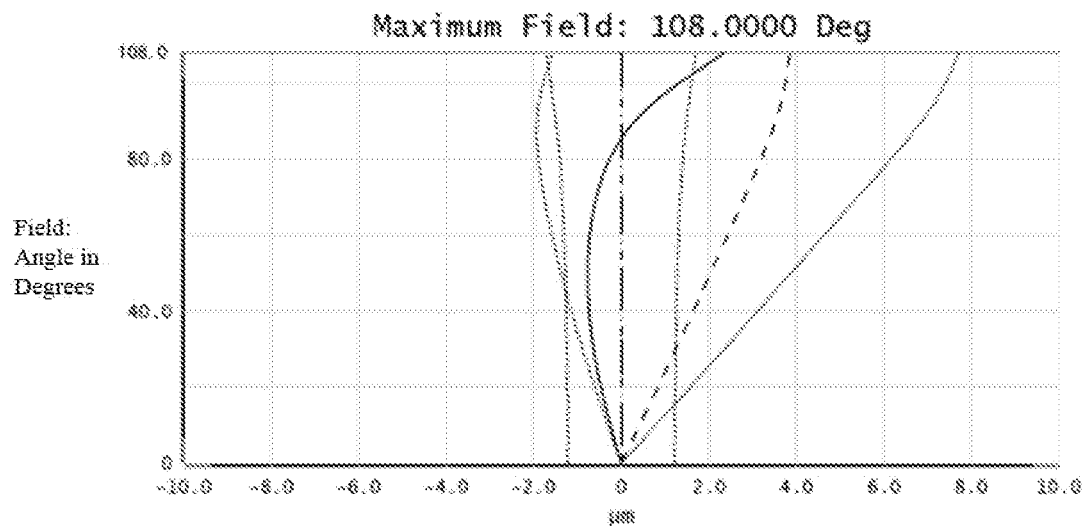
FIG. 5 is a vertical chromatic aberration diagram of the ultra-wide-angle lens according to the first embodiment of the present disclosure.

Reference numeral of main components:

| first group | Q1 | second group | Q2 |
| third group | Q3 | fourth group | Q4 |
| stop | ST | filter | G1 |

The following embodiments will further illustrate the present disclosure in conjunction with the above drawings.

DETAILED DESCRIPTION OF PREFERRED EMBODIMENTS

In order to facilitate the understanding of the present disclosure, the present disclosure will be described more fully hereinafter with reference to the accompanying drawings. Several embodiments of the disclosure are presented in the drawings. However, the disclosure may be embodied in many different forms and is not limited to the embodiments described herein. Rather, these embodiments are provided so that this disclosure will be thorough and comprehensive.

The present disclosure provide an ultra-wide-angle lens, from an object side to an image surface thereof, the ultra-wide-angle lens sequentially includes: a first group with a negative refractive power, a second group with a positive refractive power, a stop, a third group with a positive refractive power or negative refractive power, a fourth group with a positive refractive power and a filter. The first group includes at least one negative refractive power lens, the second group sequentially includes a negative refractive power lens and a positive refractive power lens, the image side surface of the negative refractive power lens of the second group is a concave surface, the object side surface and the image side surface of the positive refractive power lens of the second group each are convex surfaces. The third group includes a positive refractive power lens and a negative refractive power lens, the positive refractive power lens of the third group and the negative refractive power lens of the third group are bonded together to form an integrated body. The fourth group includes at least one positive refractive power lens.

In some embodiments, the ultra-wide-angle lens provided by the present disclosure satisfies the following expressions:

$$0<|f_{\lambda 1}-f_{\lambda 3}|\leq 0.005,$$

$$0<|f_{\lambda 5}-f_{\lambda 3}|<0.01,$$

wherein, $f_{\lambda 1}$ refers to a focal length of the ultra-wide-angle lens when a blue light of 435 nm is incident, $f_{\lambda 3}$ refers to a focal length of the ultra-wide-angle length when a green light of 550 nm is incident, and $f_{\lambda 5}$ is a focal length of the ultra-wide-angle lens when a red light of 650 nm is incident.

Satisfying this expressions, the ultra-wide-angle lens provided by the present disclosure has a small difference in focus positions of different monochromatic lights, which ensures that the ultra-wide-angle lens provided by the present disclosure has a good imaging effect on a wide range of wavelengths in the visible light range and the monochromatic lights. It is beneficial to improve the resolution of the ultra-wide-angle lens to objects that emit or reflect monochromatic light such as signal indicators, highway signs, etc.

In some embodiments, the ultra-wide-angle lens provided by the present disclosure satisfies the following expressions:

$$-2<f_{Q11}/(r_1-r_2)<0,$$

wherein, $f_{Q11}$ is a focal length of the negative refractive power lens of the first which is adjacent to the object side, $r_1$ is a radius of curvature of the object side surface of the negative refractive power lens of the first group which is adjacent to the object side, and $r_2$ is a radius of curvature of the image surface of the negative refractive power lens of the first group which is adjacent to the object side.

Satisfying this expression can effectively converge light, ensuring ultra-wide-angle lens can achieve ultra-wide angle (FOV>200°) imaging.

In some embodiments, the ultra-wide-angle lens provided by the present disclosure satisfies the following expression:

$$0<f_{Q4}/|r_{13}|<2,$$

wherein, $f_{Q4}$ is a focal length of the fourth group, and $r_{13}$ is a radius of curvature of an image side surface of the positive refractive power lens of the fourth group which is adjacent to the imaging surface (the last lens).

Satisfying this expression can effectively ensure the exit angle of the chief ray of the ultra-wide-angle lens, reduce the port diameter of the ultra-wide-angle lens, and reduce the optical aberration such as spherical aberration and coma.

In some embodiments, the ultra-wide-angle lens provided by the present disclosure satisfies the following expressions:

$$0<|f_{Q2-}/f_{Q3+}|<2,$$

$$0<|f_{Q2+}/f_{Q3-}|<2,$$

$$0.5<n_{Q2-}/n_{Q3+}<1.5,$$

$$0.5<n_{Q2+}/n_{Q3-}<1.5,$$

wherein, $f_{Q2-}$ is a focal length of the negative refractive power lens of the second group, $f_{Q2+}$ is a focal length of the positive refractive power lens of the second group, $f_{Q3+}$ is a focal length of the positive refractive power lens of the third group, $f_{Q3-}$ is a focal length of the negative refractive power lens of the third group, $n_{Q2-}$ is a refractive index of the negative power lens of the second group, $n_{Q2+}$ is a refractive index of the positive power lens of the second group, $n_{Q3+}$ is a refractive index of the positive power lens of the third group, and $n_{Q3-}$ is a refractive index of the negative power lens of the third group.

Satisfying this expressions, the negative refractive power lens of the second group and the positive refractive power lens of the third group with the same or similar focal length and refractive index, and the positive refractive power lens of the second group and the negative refractive power lens of the third group with the same or similar focal length and refractive index, thereby effectively reducing the aberration of the lens, reducing the influence of tolerance and improving the assembly yield.

In some embodiments, the ultra-wide-angle lens provided by the present disclosure satisfies the following conditions:

$$(dn/dt)_{Q41}<-3\times 10^{-6}/°\ C.$$

wherein, $(dn/dt)_{Q41}$ is a refractive index temperature coefficient of the positive refractive power lens of the fourth group which adjacent to the object side.

Since the refractive index temperature coefficient of the positive power lens close to the object side of the fourth group is a negative value, for example, when the refractive index temperature coefficient less than $-3\times 10^{-6}/°$ C., the optical focal length can be increased at a high temperature and decreased at a low temperature. It effectively compensates the thermal expansion of the structural parts such as the lens barrel and the lens holder, and ensures the good resolution of the ultra-wide-angle lens both at high temperature and at low temperature.

In some embodiments, the ultra-wide-angle lens provided by the present disclosure satisfies the following expressions:

$$Vd_{Q41} > 60,$$

$$\Delta Pg, F_{Q41} > 0.01,$$

wherein, $Vd_{Q41}$ is the abbe number of the positive refractive power lens of the fourth group which is adjacent to the object side, and $\Delta Pg, F_{Q41}$ is a deviation of relative partial dispersion from the abbe empirical formula of the positive refractive power lens of the fourth group which is adjacent to the object side.

When the positive refractive power lens of the fourth group which is adjacent to the object side has a low-dispersion and high-partial dispersion, it can effectively reduce the focus movement of the ultra-wide-angle lens caused by the environmental temperature change, effectively solve the thermal drift, and can effectively correct the secondary spectrum makes the focus position of the monochromatic light of different wavelengths closer, effectively improving the MTF (Modulation Transfer Function) of the visible light monochromatic light, so that the ultra-wide-angle lens provided by the disclosure not only has reliable thermal stability, but also has a good imaging effect on monochromatic light in a wide band in the visible range, which is beneficial to improve the resolution of the lens to objects that emit or reflect monochromatic light such as signal indicators, highway signs, etc.

In some embodiments, the ultra-wide-angle lens provided by the present disclosure satisfies the following expression:

$$-10 < f_{Q1} < 0,$$

wherein, $f_{Q1}$ is a focal length of the first group. Satisfying this expression, the incident angle of the light can be greatly reduced, thereby reducing the aberration generated by the lens.

In some embodiments, each of the lenses in the ultra-wide-angle lens adopts a glass lens, and the glass lens has stable performance and can achieve athermalization over a wide temperature span.

In some embodiments, at least one lens of the ultra-wide-angle lens is an aspherical lens, and the aspherical lens can effectively correct the aberration of the lens and improve the resolution of the entire lens.

In some embodiments, the first group of the ultra-wide-angle lens of the present disclosure includes a negative refractive power lens, the fourth group can include a positive refractive power lens or two positive refractive power lenses, in other embodiments, the first group of the ultra-wide-angle lens includes two negative refractive power lenses, the fourth group can include a positive refractive power lens or two positive refractive power lenses to meet the special needs of the different in-vehicle system for lens performance.

Furthermore, satisfying the configuration makes for ensuring the ultra-wide-angle lens with an ultra-wide angle, a large aperture, good thermal stability, excellent wide-spectrum imaging performance. To improve the magnification of the edge field of view by controlling the distortion of f-θ, so that improve the resolution of the edge of the ultra-wide-angle lens, that satisfies the edge field of view and has sufficient resolution after being flattened.

The surface shape of the aspherical surface of the ultra-wide-angle lens in each of the embodiments of the present disclosure satisfies the following equation:

$$z = \frac{ch^2}{1 + \sqrt{1 - (1+K)c^2h^2}} + Bh^4 + Ch^6 + Dh^8 + Eh^{10} + Fh^{12},$$

Wherein, z is a vector height between a position on the aspheric surface and a vertex of the aspheric surface along an optical axis of the collimating lens, c is a curvature of the aspheric surface, K is a quadratic surface coefficient, h is a distance between the position and the optical axis, B is a fourth order surface coefficient, C is a sixth order surface coefficient, D is an eighth order surface coefficient, E is a tenth order surface coefficient, F is a twelfth order surface coefficient.

In each of the following embodiments, the thickness, the radius of curvature and the material of each lens in the ultra-wide-angle lens are different. For details, refer to the parameter table of each embodiment.

First Embodiment

Please refer to FIG. 1, the first embodiment of the present disclosure provides an ultra-wide-angle lens 100, from the object side to the imaging surface S16, the ultra-wide-angle lens 100 sequentially includes: a first group Q1, a second group Q2, a stop ST, a third group Q3, a fourth group Q4, and a filter G1.

The first group Q1 has a negative refractive power, the first group Q1 sequentially includes a first lens L1 and a second lens L2, wherein the first lens L1 has a negative refractive power, and an object side surface S1 of the first lens L1 is a convex surface, an image side surface S2 of the first lens L1 is a concave surface. The second lens L2 has a negative refractive power, and an object side surface S3 and an image side surface S4 of the second lens L2 both are concave surfaces, the object side surface S3 and the image side surface S4 of the second lens L2 are spherical surfaces.

The second group Q2 has a positive refractive power, the second group Q2 sequentially includes a third lens L3 and a fourth lens L4, wherein the third lens L3 has a negative refractive power, and an image side surface S6 of the third lens L3 is a concave surface. The fourth lens L4 has a positive refractive power, an object side surface S7 and an image side surface S8 of the fourth lens L4 both are convex surfaces.

The third group Q3 has a positive refractive power, the third group Q3 includes a fifth lens L5 and a sixth lens L6, the fifth lens L5 has a negative refractive power, the sixth lens L6 has a positive refractive power, the fifth lens L5 and the sixth lens L6 are bonded together to form an integrated body. Specifically, an image side surface S10 of the fifth lens L5 and an object side surface S10 of the sixth lens L6 are bonded together to form an integrated body.

The fourth group Q4 has a positive refractive power, the fourth group Q4 includes a seventh lens L7, wherein the seventh lens L7 has a positive refractive power, an object side surface S12 and an image side surface S13 of the seventh lens L7 both are convex surfaces.

The stop ST is disposed between the second group Q2 and the third group Q3.

The filter G1 is disposed between the fourth group Q4 and the imaging surface.

Wherein, the seven lenses of the ultra-wide-angle lens 100 provided by the embodiment each are made of glass material, the third lens L3 and the seventh lens L7 each adopt glass aspheric lenses.

Related parameters of each lens in the ultra-wide-angle lens are shown in Table 1-1.

TABLE 1-1

| Surface No. | | Surface type | Radius of curvature | Thickness | Refractive index | Abbe number |
|---|---|---|---|---|---|---|
| Object surface | | Spherical surface | Infinity | Infinity | | |
| S1 | L1 | Spherical surface | 12.785362 | 1.079360 | 1.911 | 35.26 |
| S2 | | Spherical surface | 4.688754 | 3.529992 | | |
| S3 | L2 | Spherical surface | −89.888416 | 0.588797 | 1.729 | 54.67 |
| S4 | | Spherical surface | 3.103831 | 1.749597 | | |
| S5 | L3 | Aspheric surface | 66.607284 | 0.984173 | 1.497 | 81.52 |
| S6 | | Aspheric surface | 8.200874 | 0.503604 | | |
| S7 | L4 | Spherical surface | 7.018129 | 1.995428 | 1.923 | 20.88 |
| S8 | | Spherical surface | −8.187928 | 0.433443 | | |
| ST | Stop | Stop | Infinity | 1.131880 | | |
| S9 | L5 | Spherical surface | −9.800827 | 0.594946 | 1.946 | 17.94 |
| S10 | L6 | Spherical surface | 4.085775 | 2.319029 | 1.734 | 51.49 |
| S11 | | Spherical surface | −5.642701 | 0.097624 | | |
| S12 | L7 | Aspheric surface | 6.734559 | 2.709229 | 1.554 | 71.72 |
| S13 | | Aspheric surface | −5.833431 | 3.300000 | | |
| S14 | Filter | Spherical surface | Infinity | 0.800000 | 1.517 | 64.21 |
| S15 | | Spherical surface | Infinity | 0.183190 | | |
| S16 | The imaging surface | Imaging surface | Infinity | — | | |

The parameters of the aspheric surfaces of the lenses of this embodiment are shown in Table 1-2.

TABLE 1-2

| Surface No. | K | B | C | D | E | F |
|---|---|---|---|---|---|---|
| S5 | −6.706827 | 6.796496E−03 | −6.071256E−04 | 4.534476E−05 | −2.384205E−06 | 0.000000E+00 |
| S6 | 9.016938 | 7.085548E−03 | −1.231358E−03 | 1.547551E−04 | −2.301201E−05 | 0.000000E+00 |
| S12 | −10.797097 | 2.151468E−03 | −2.965669E−04 | 1.343131E−05 | 1.251166E−07 | 0.000000E+00 |
| S13 | −9.410537 | −5.054632E−03 | 4.499628E−04 | −3.794190E−05 | 1.584419E−06 | 0.000000E+00 |

In this embodiment, the field curvature, distortion, axial chromatic aberration, and vertical axis chromatic aberration are sequentially shown in FIG. 2, FIG. 3, FIG. 4, and FIG. 5. As can be seen from FIG. 2 to FIG. 5, field curvature, distortion, axial chromatic aberration and vertical axis chromatic aberration can be well corrected in this embodiment.

Second Embodiment

Figure 6:
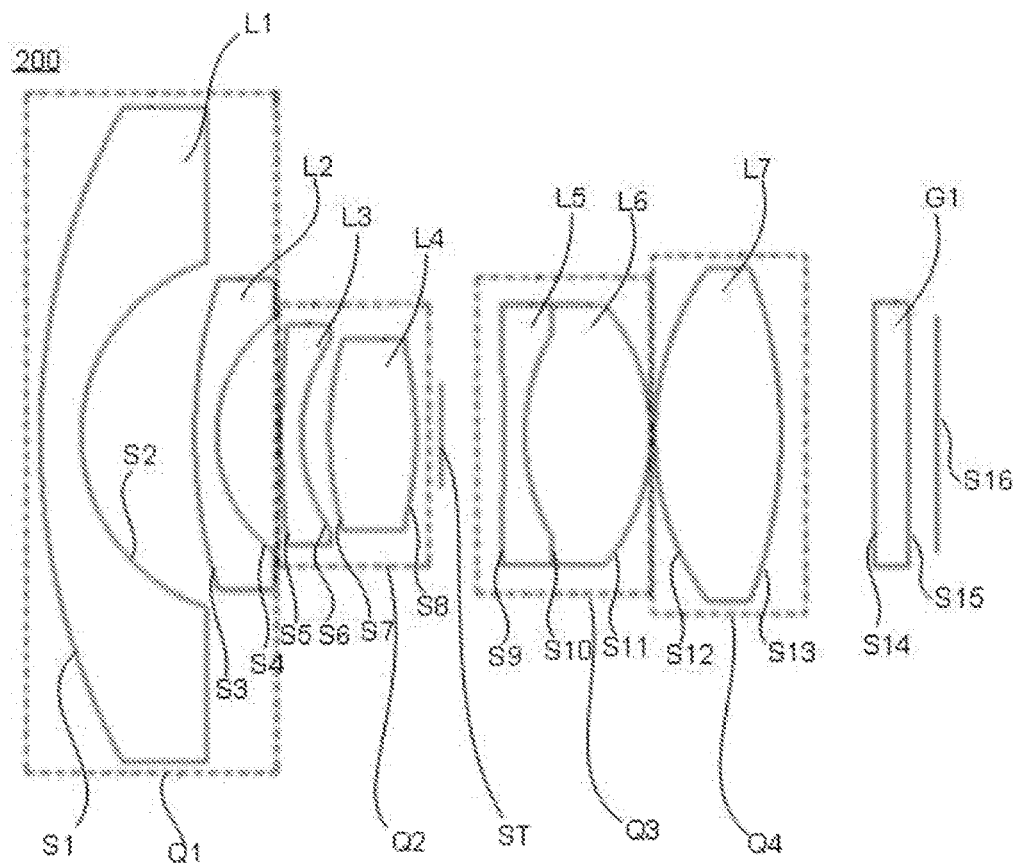
FIG. 6 is a schematic cross-sectional view of the ultra-wide-angle lens according to the second embodiment of the present disclosure.
Figure 7:
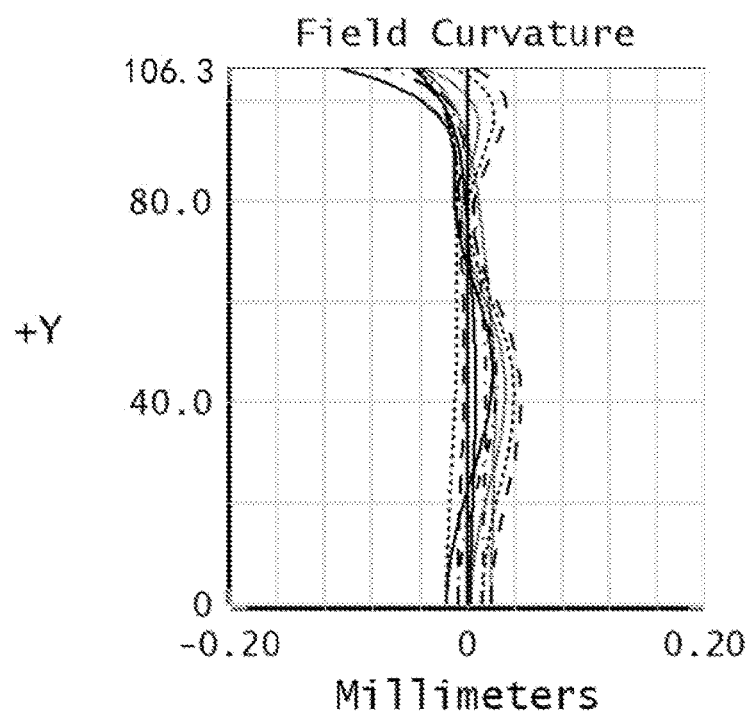
FIG. 7 is a field curvature diagram of the ultra-wide-angle lens according to the second embodiment of the present disclosure.
Figure 8:
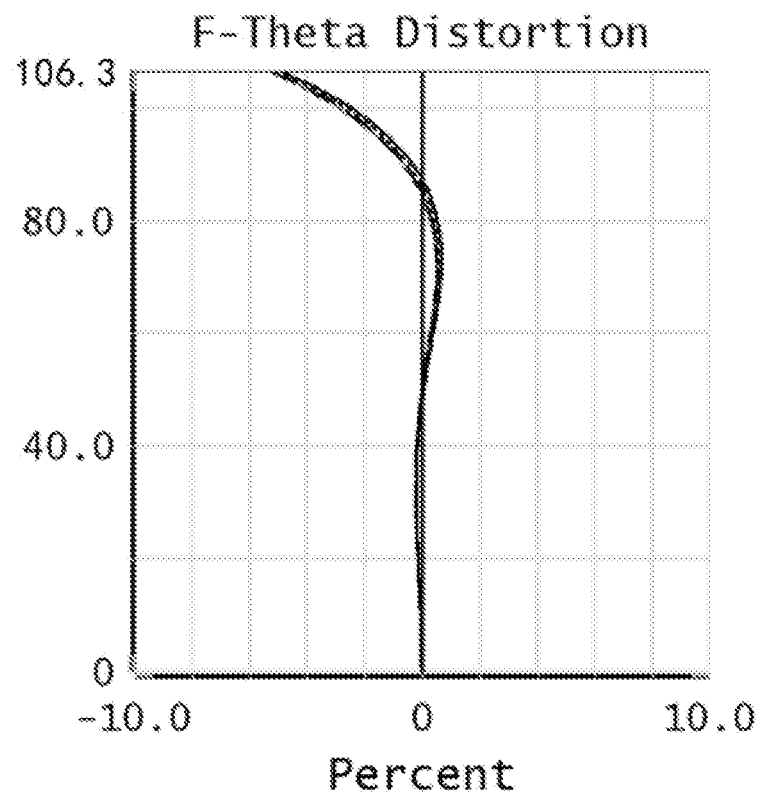
FIG. 8 is a distortion diagram of the ultra-wide-angle lens according to the second embodiment of the present disclosure.
Figure 9:
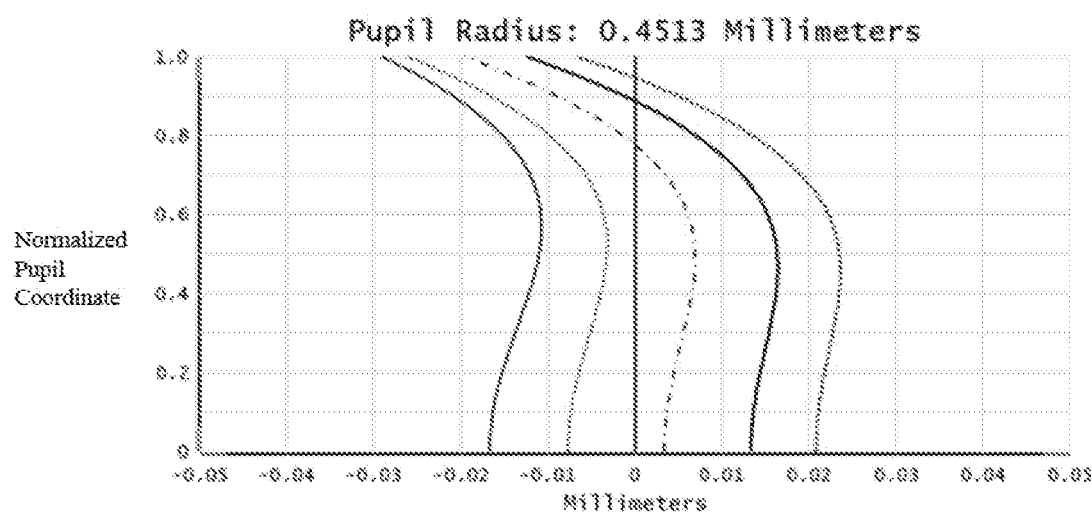
FIG. 9 is an axial chromatic aberration diagram of the ultra-wide-angle lens according to the second embodiment of the present disclosure.
Figure 10:
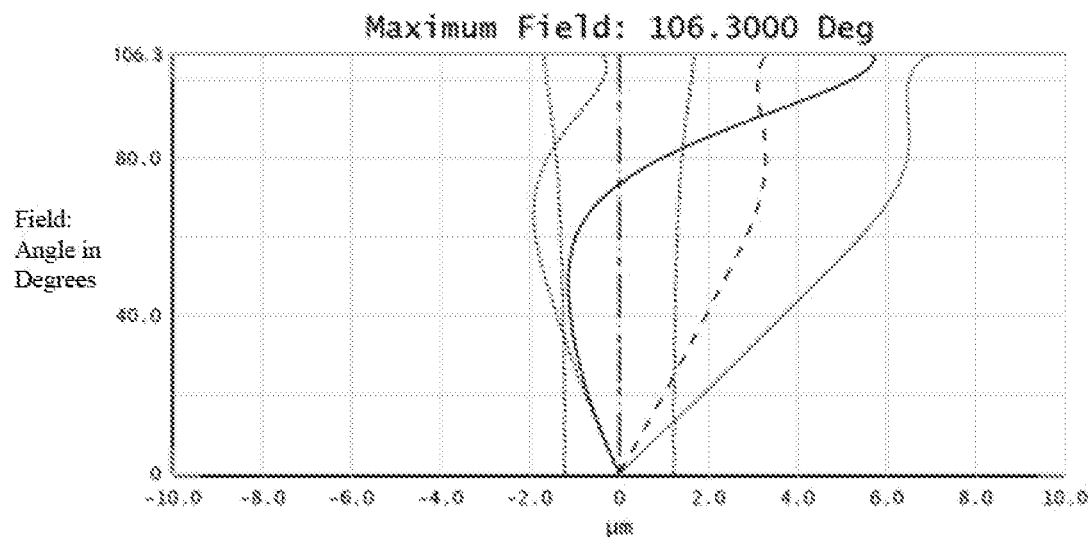
FIG. 10 is a vertical chromatic aberration diagram of the ultra-wide-angle lens according to the second embodiment of the present disclosure.

Please refer to FIG. 6, FIG. 6 is a structural diagram of an ultra-wide-angle lens according to this embodiment. The ultra-wide-angle lens 200 in this embodiment is substantially the same as the ultra-wide-angle lens 100 in the first embodiment, except that the object side surface S3 of the second lens L2 of the ultra-wide-angle lens 200 is a convex surface, the object side surface S3 and the image side surface S4 of the second lens L2 both are aspherical surfaces, and the radius of curvature and the material of each lens are different. Related parameters of each lens in the ultra-wide-angle lens are shown in Table 2-1.

TABLE 2-1

| Surface No. | | Surface type | Radius of curvature | Thickness | Refractive index | Abbe number |
|---|---|---|---|---|---|---|
| Object surface | | Spherical surface | Infinity | Infinity | | |
| S1 | L1 | Spherical surface | 16.476266 | 1.004595 | 1.804 | 46.59 |
| S2 | | Spherical surface | 4.376092 | 2.790159 | | |
| S3 | L2 | Aspheric surface | 29.146981 | 0.543682 | 1.589 | 61.25 |
| S4 | | Aspheric surface | 4.183646 | 1.567953 | | |
| S5 | L3 | Spherical surface | 26.082369 | 0.500312 | 1.755 | 52.34 |
| S6 | | Spherical surface | 4.198447 | 0.684030 | | |
| S7 | L4 | Spherical surface | 8.212900 | 2.129112 | 1.923 | 20.88 |
| S8 | | Spherical surface | −8.212900 | 0.633344 | | |
| ST | Stop | Stop | Infinity | 1.535645 | | |
| S9 | L5 | Spherical surface | −28.458624 | 0.502904 | 1.946 | 17.98 |
| S10 | L6 | Spherical surface | 4.955436 | 3.082691 | 1.691 | 54.86 |
| S11 | | Spherical surface | −4.955436 | 0.095714 | | |
| S12 | L7 | Aspheric surface | 5.596978 | 3.098848 | 1.554 | 71.72 |
| S13 | | Aspheric surface | −11.364539 | 2.300000 | | |
| S14 | Filter | Spherical surface | Infinity | 0.800000 | 1.517 | 64.21 |
| S15 | | Spherical surface | Infinity | 0.731935 | | |

TABLE 2-1-continued

| Surface No. | | Surface type | Radius of curvature | Thickness | Refractive index | Abbe number |
|---|---|---|---|---|---|---|
| S16 | The imaging surface | Imaging surface | Infinity | — | | |

The parameters of the aspheric surfaces of the lenses of this embodiment are shown in Table 2-2.

TABLE 2-2

| Surface No. | K | B | C | D | E | F |
|---|---|---|---|---|---|---|
| S3 | 30.484932 | 6.274810E−03 | −4.257815E−04 | 5.344742E−06 | 5.593710E−08 | 0.000000E+00 |
| S4 | 0.798868 | 7.274487E−03 | −9.849226E−05 | −3.069595E−05 | −7.350995E−06 | 0.000000E+00 |
| S12 | −1.134628 | −9.152092E−04 | 1.137297E−04 | −1.069101E−05 | 3.329655E−07 | 0.000000E+00 |
| S13 | −4.818635 | −9.868806E−04 | 1.428615E−04 | −1.390002E−05 | 4.432497E−07 | 0.000000E+00 |

In the present embodiment, the curvature of field, distortion, axial chromatic aberration, and vertical axis chromatic aberration are as shown in FIG. 7, FIG. 8, FIG. 9, and FIG. 10. It can be seen from FIG. 7 to FIG. 10 that the field curvature, the distortion, the axial chromatic aberration, and the vertical axis chromatic aberration can be well corrected in this embodiment.

Third Embodiment

Figure 11:
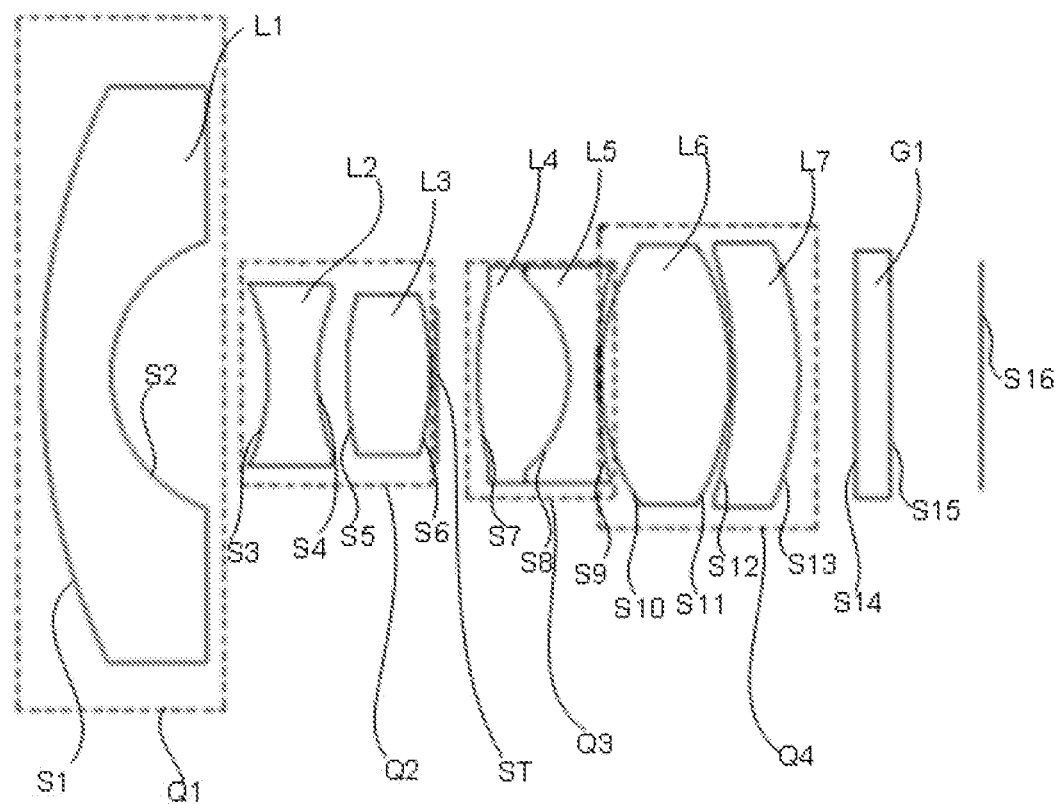
FIG. 11 is a schematic cross-sectional view of the ultra-wide-angle lens according to the third embodiment of the present disclosure.
Figure 12:
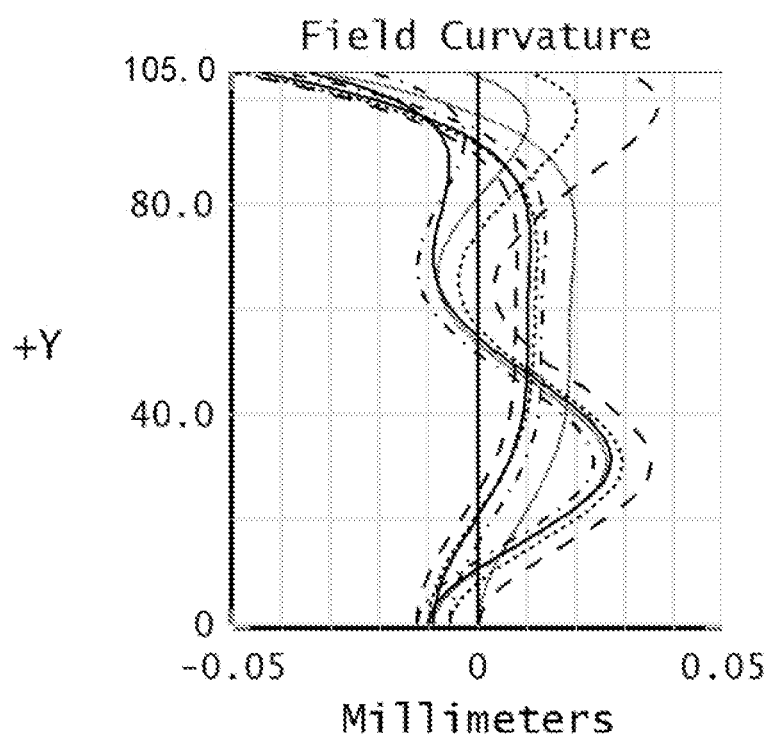
FIG. 12 is a field curvature diagram of the ultra-wide-angle lens according to the third embodiment of the present disclosure.
Figure 13:
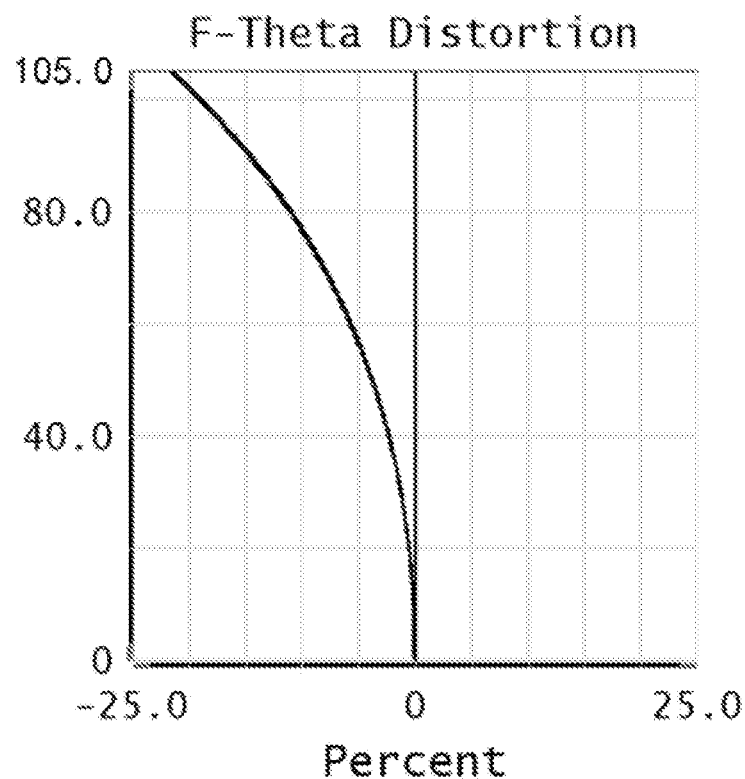
FIG. 13 is a distortion diagram of the ultra-wide-angle lens according to the third embodiment of the present disclosure.
Figure 14:
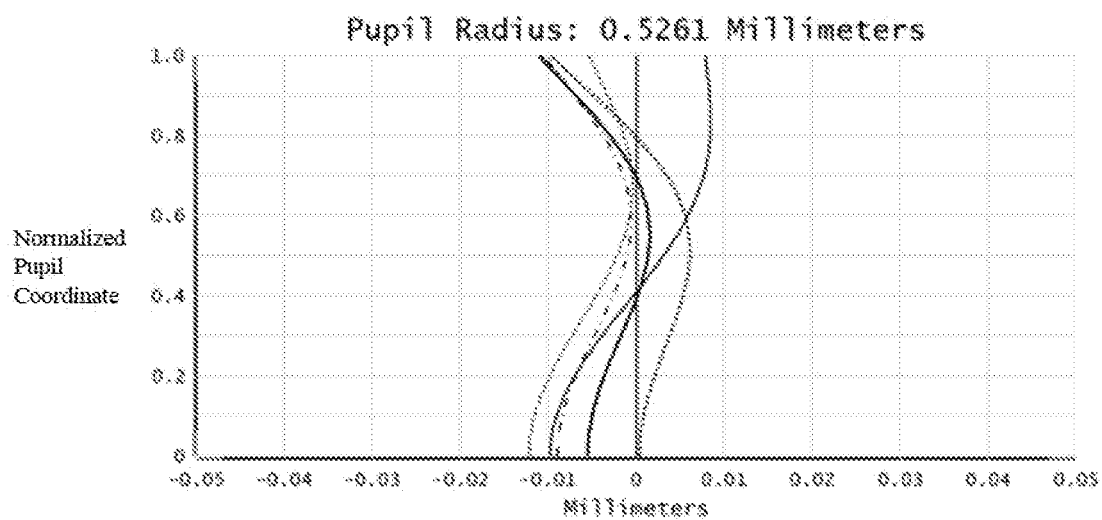
FIG. 14 is an axial chromatic aberration diagram of the ultra-wide-angle lens according to the third embodiment of the present disclosure.
Figure 15:
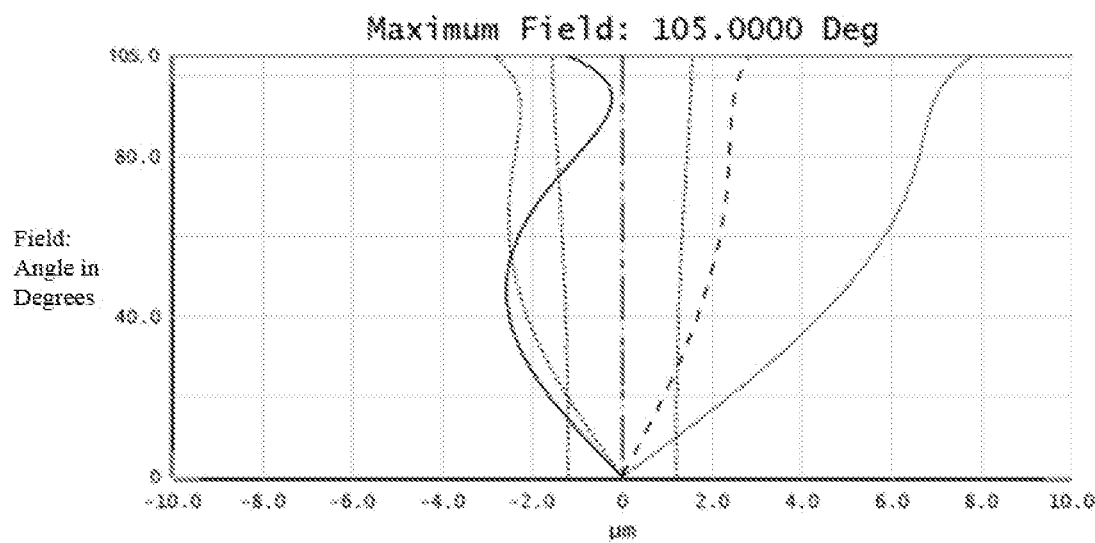
FIG. 15 is a vertical chromatic aberration diagram of the ultra-wide-angle lens according to the fourth embodiment of the present disclosure.

Please refer to FIG. 11, FIG. 11 is a structural diagram of an ultra-wide-angle lens 300 according to this embodiment, from the object side to the imaging surface S16, the ultra-wide-angle lens 300 sequentially includes a first group Q1, a second group Q2, a stop ST, a third group Q3, a fourth group Q4 and a filter G1.

The first group Q1 has a negative refractive power, the first group Q1 includes a first lens L1, wherein the first lens L1 has a negative refractive power, and the object side surface S1 of the first lens L1 is a convex surface, and the image side surface S2 of the first lens L1 is a concave surface.

The second group Q2 has a positive refractive power, the second group Q2 sequentially includes a second lens L2 and a third lens L3, wherein the second lens L2 has a negative refractive power, the image side surface S4 of the second lens L2 is a concave surface, the third lens L3 has a positive refractive power, the object side surface S5 and the image side surface S6 of the third lens L3 both are convex surfaces.

The third group Q3 has a negative refractive power, the third group Q3 includes a fourth lens L4 and a fifth lens L5, the fourth lens L4 has a positive refractive power, the fifth lens L5 has a negative refractive power, the fourth lens L4 and the fifth lens L5 are bonded together to form an integrated body.

The fourth group Q4 has a positive refractive power, the fourth group Q4 includes a sixth lens L6 and a seventh lens L7, wherein the sixth lens L6 has a positive refractive power, the seventh lens L7 has a positive refractive power. The seventh lens L7 is disposed between the sixth lens L6 and the imaging surface S16, and the seventh lens L7 is the last lens of the ultra-wide-angle lens 300, wherein the object side surface S10 and the image side surface S11 of the sixth lens L6 both are convex surfaces.

The seven lenses (L1, L2, L3, L4, L5, L6, and L7) included in the ultra-wide-angle lens 300 provided in this embodiment each are made of glass material, and the seventh lens L7 adopt glass aspherical lens.

Specifically, related parameters of each lens in the ultra-wide-angle lens 300 are shown in Table 3-1.

TABLE 3-1

| Surface No. | Surface type | Radius of curvature | Thickness | Refractive hides | Abbe number |
|---|---|---|---|---|---|
| Object surface | Spherical surface | Infinity | Infinity | | |
| S1 | L1 Spherical surface | 15.590737 | 1.647937 | 1.883 | 40.81 |
| S2 | Spherical surface | 3.373759 | 3.737395 | | |
| S3 | L2 Spherical surface | −5.290810 | 1.163450 | 1.755 | 52.34 |
| S4 | Spherical surface | 5.046783 | 0.697001 | | |
| S5 | L3 Spherical surface | 7.562603 | 1.987492 | 1.847 | 23.79 |
| S6 | Spherical surface | −6.688568 | 0.154700 | | |
| ST | Stop Stop | Infinity | 0.966243 | | |
| S7 | L4 Spherical surface | 8.634003 | 2.160738 | 1.729 | 54.64 |
| S8 | L5 Spherical surface | −3.044859 | 0.686928 | 1.847 | 23.79 |
| S9 | Spherical surface | 10.652509 | 0.079644 | | |
| S10 | L6 Spherical surface | 5.532586 | 3.072695 | 1.593 | 68.53 |
| S11 | Spherical surface | −6.442243 | 0.086936 | | |
| S12 | L7 Aspheric surface | −566.393004 | 1.536814 | 1.808 | 40.92 |
| S13 | Aspheric surface | −11.441266 | 1.365264 | | |
| S14 | Filter Spherical surface | Infinity | 0.800000 | 1.517 | 64.20 |
| S15 | Spherical surface | Infinity | 2.175423 | | |
| S16 | The imaging surface Imaging surface | Infinity | — | | |

The parameters of the aspheric surfaces of the lenses of this embodiment are shown in Table 3-2.

TABLE 3-2

| Surface No. | K | B | C | D | E | F |
|---|---|---|---|---|---|---|
| S12 | 0.000000 | −5.650915E−03 | 2.544666E−04 | −1.167956E−04 | 1.324574E−05 | −4.391076E−07 |
| S13 | 0.000000 | −2.726050E−03 | 7.659703E−05 | −2.366245E−05 | 3.140175E−06 | −7.279025E−08 |

In this embodiment, the field curvature, distortion, axial chromatic aberration, and vertical axis chromatic aberration are sequentially shown in FIG. 12, FIG. 13, FIG. 14, and FIG. 15. As can be seen from FIG. 12 to FIG. 15, field curvature, distortion, axial chromatic aberration and vertical axis chromatic aberration can be well corrected in this embodiment.

Fourth Embodiment

Figure 16:
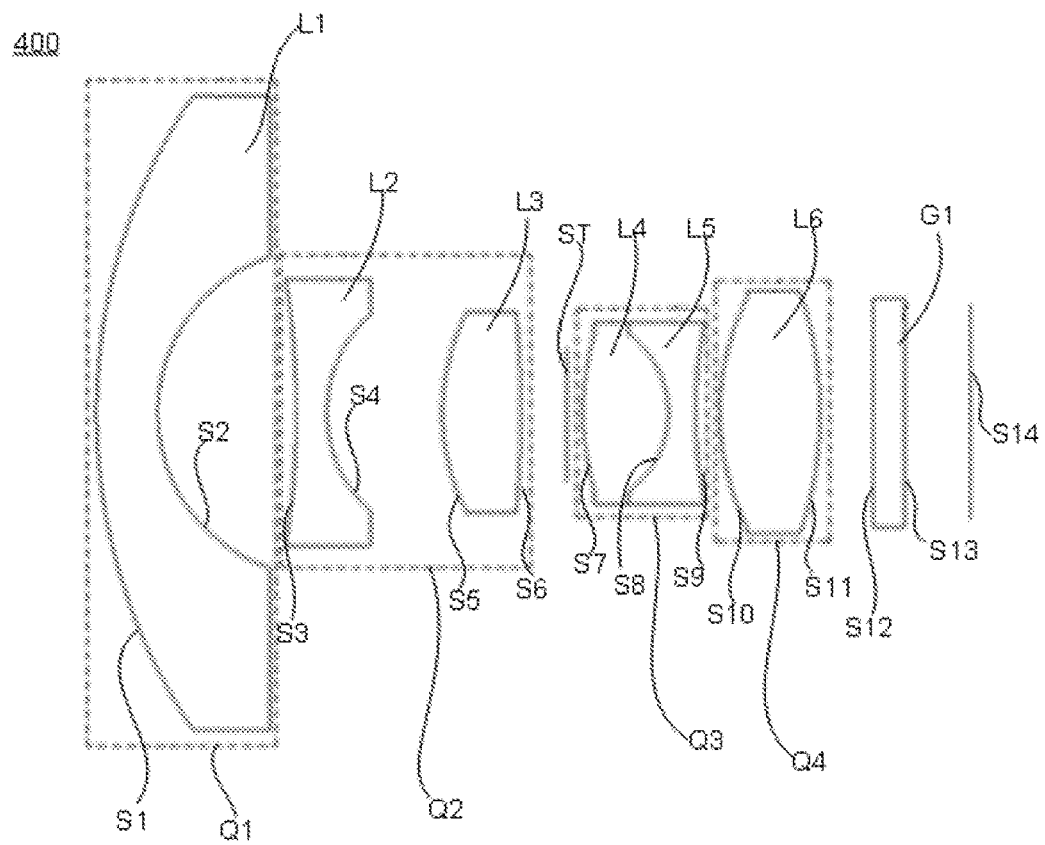
FIG. 16 is a schematic cross-sectional view of the ultra-wide-angle lens according to the fourth embodiment of the present disclosure.
Figure 17:
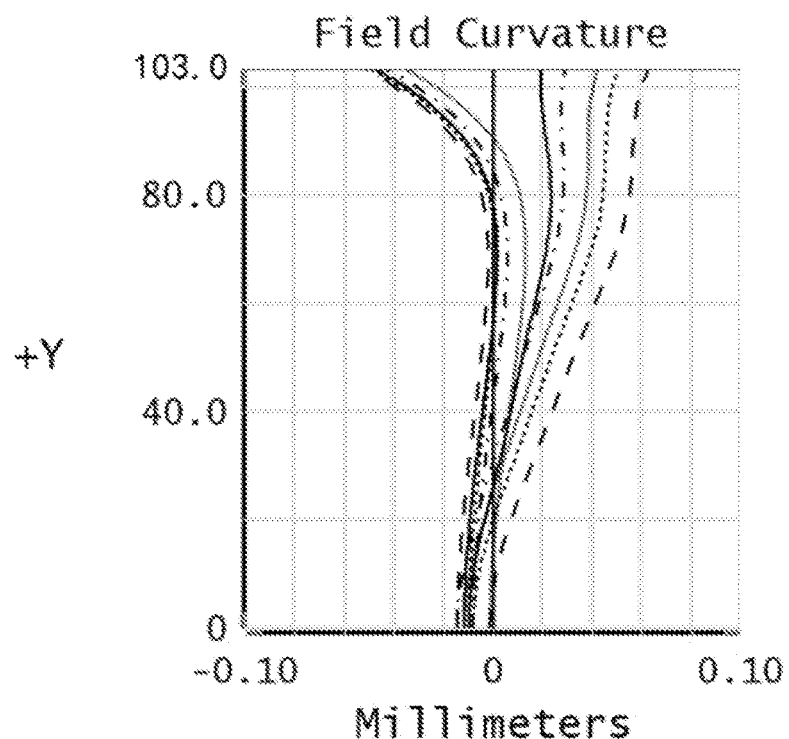
FIG. 17 is a field curvature diagram of the ultra-wide-angle lens according to the fourth embodiment of the present disclosure.
Figure 18:
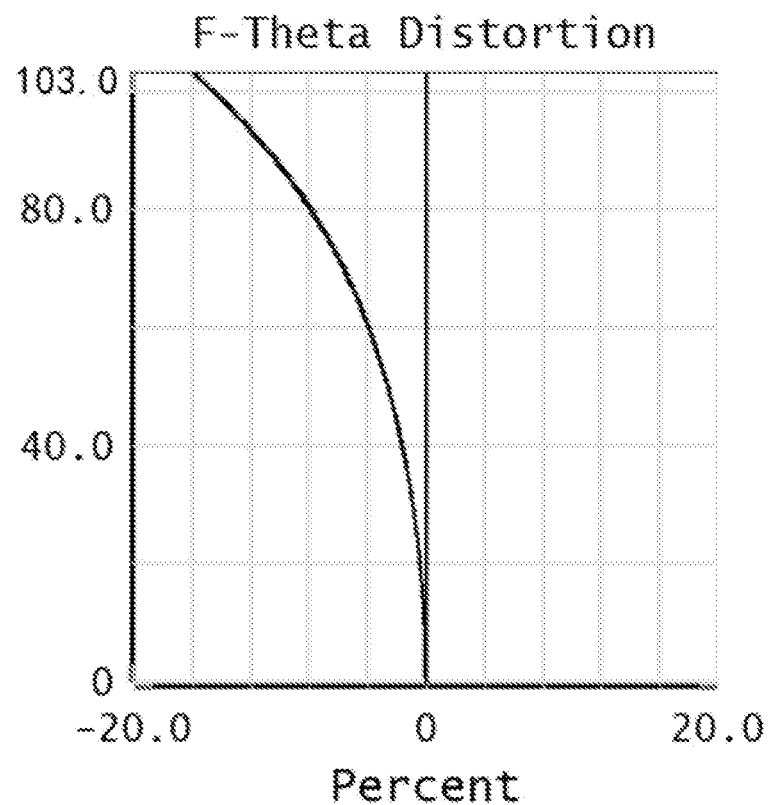
FIG. 18 is a distortion diagram of the ultra-wide-angle lens according to the fourth embodiment of the present disclosure.
Figure 19:
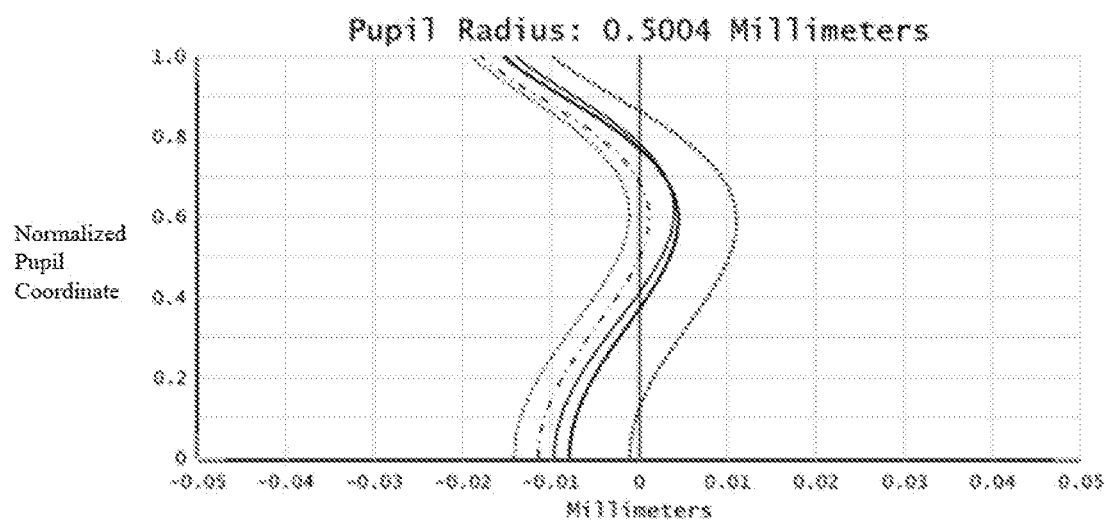
FIG. 19 is an axial chromatic aberration diagram of the ultra-wide-angle lens according to the fourth embodiment of the present disclosure.
Figure 20:
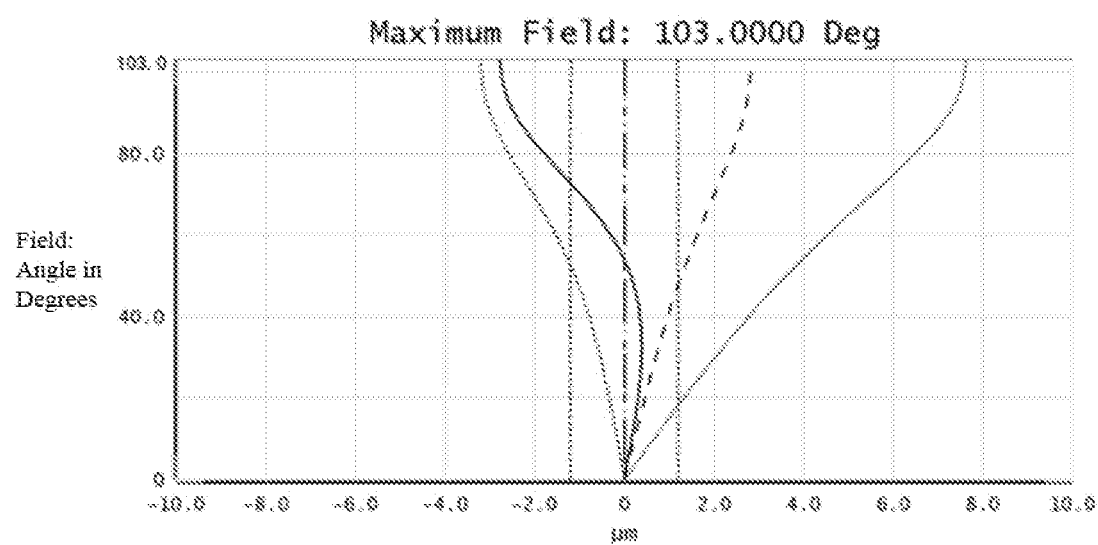
FIG. 20 is a vertical chromatic aberration diagram of the ultra-wide-angle lens according to the fourth embodiment of the present disclosure.

Please refer to FIG. 16, FIG. 16 is a structural diagram of an ultra-wide-angle lens 400 according to this embodiment, from the object side to the imaging surface, the ultra-wide-angle lens 400 sequentially includes a first group Q1, a second group Q2, a stop ST, a third group Q3, a fourth group Q4 and a filter G1.

The first group Q1 has a negative refractive power, the first group Q1 includes a first lens L1, wherein the first lens L1 has a negative refractive power, and the object side surface S1 of the first lens L1 is a convex surface, the image side surface S2 of the first lens L1 is a concave surface.

The second group Q2 has a positive refractive power, the second group Q2 includes a second lens L2 and a third lens L3, wherein the second lens L2 has a negative refractive power, the image side surface S4 of the second lens L2 is a concave surface, the third lens L3 has a positive refractive power, the object side surface S5 and the image side surface S6 of the third lens L3 both are convex surfaces.

The third group Q3 has a negative refractive power, the third group Q3 includes a fourth lens L4 and a fifth lens L5, the fourth lens L4 has a positive refractive power, the fifth lens L5 has a negative refractive power, the fourth lens L4 and the fifth lens L5 are bonded together to form an integrated body.

The fourth group Q4 has a positive refractive power, the fourth group Q4 includes a sixth lens L6, wherein the sixth lens L6 has a positive refractive power. The sixth lens L6 is the last lens of the ultra-wide-angle lens 400 wherein the object side surface S10 and the image side surface S11 of the sixth lens L6 both are convex surfaces.

The six lenses (L1, L2, L3, L4, L5, and L6) included in the ultra-wide-angle lens 400 provided in this embodiment each are made of a glass material, the second lens L2 and the sixth lens L6 each adopt glass aspherical lenses.

Specifically, related parameters of each lens in the ultra-wide-angle lens 400 are shown in Table 4-1.

TABLE 4-1

| Surface No. | | Surface type | Radius of curvature | Thickness | Refractive index | Abbe number |
|---|---|---|---|---|---|---|
| Object surface | | Spherical surface | Infinity | Infinity | | |
| S1 | L1 | Spherical surface | 14.378433 | 1.586624 | 1.883 | 40.81 |
| S2 | | Spherical surface | 4.175329 | 3.579477 | | |

TABLE 4-1-continued

| Surface No. | | Surface type | Radius of curvature | Thickness | Refractive index | Abbe number |
|---|---|---|---|---|---|---|
| S3 | L2 | Aspheric surface | −21.021470 | 0.785948 | 1.743 | 49.19 |
| S4 | | Aspheric surface | 3.349686 | 3.000499 | | |
| S5 | L3 | Spherical surface | 5.590559 | 2.034684 | 1.805 | 25.48 |
| S6 | | Spherical surface | −25.809326 | 1.160690 | | |
| ST | Stop | Stop | Infinity | 0.430067 | | |
| S7 | L4 | Spherical surface | 6.887847 | 2.210611 | 1.729 | 54.64 |
| S8 | L5 | Spherical surface | −2.510008 | 0.702185 | 1.847 | 23.79 |
| S9 | | Spherical surface | 11.062322 | 0.632262 | | |
| S10 | L6 | Aspheric surface | 4.854233 | 2.607733 | 1.497 | 81.52 |
| S11 | | Aspheric surface | −9.086174 | 1.365264 | | |
| S12 | Filter | Spherical surface | Infinity | 0.800000 | 1.517 | 64.21 |
| S13 | | Spherical surface | Infinity | 1.727827 | | |
| S14 | The imaging surface | Imaging surface | Infinity | — | | |

The parameters of the aspheric surfaces of the lenses of this embodiment are shown in Table 4-2.

TABLE 4-2

| Surface No. | K | B | C | D | E | F |
|---|---|---|---|---|---|---|
| S3 | −0.631449 | −3.446932E−05 | −5.243890E−07 | −1.532249E−09 | −7.606990E−11 | −1.227049E−12 |
| S4 | 0.466708 | −1.012412E−05 | −9.352825E−07 | 4.791315E−09 | −2.877603E−10 | 1.853694E−12 |
| S10 | −6.081529 | −4.361915E−03 | 1.729434E−04 | 8.493039E−06 | −4.924554E−06 | 2.991462E−07 |
| S11 | −15.792797 | 8.399521E−04 | −1.357887E−04 | 3.967621E−05 | −5.977574E−06 | 2.673272E−07 |

In this embodiment, the field curvature, distortion, axial chromatic aberration, and vertical axis chromatic aberration are sequentially shown in FIG. 17, FIG. 18, FIG. 19, and FIG. 20. As can be seen from FIG. 17 to FIG. 20, field curvature, distortion, axial chromatic aberration and vertical axis chromatic aberration can be well corrected in this embodiment.

Table 5 shows the above four embodiments and their corresponding optical characteristics. Table 5 includes the system focal length f, the aperture number F#, the field angle 2θ and the system optical total length TTL, and values corresponding to each of the preceding conditional expressions.

TABLE 5

| Condition | The first embodiment | The second embodiment | The third embodiment | The fourth embodiment |
|---|---|---|---|---|
| f (mm) | 1.600 | 1.620 | 1.890 | 1.801 |
| F# | 1.800 | 1.800 | 1.800 | 1.800 |

TABLE 5-continued

| Condition | The first embodiment | The second embodiment | The third embodiment | The fourth embodiment |
|---|---|---|---|---|
| 2θ(deg) | 216.0 | 212.60° | 210.0° | 206.0 |
| TTL (mm) | 22.0 | 22.0 | 22.3 | 22.6 |
| $|f_{\lambda 1} - f_{\lambda 3}|$ | 0.0016 | 0.0022 | 0.0050 | 0.0012 |
| $|f_{\lambda 5} - f_{\lambda 3}|$ | 0.0050 | 0.0054 | 0.0076 | 0.0053 |
| $f_{O11}/(r_1 - r_2)$ | −1.067 | −0.634 | −0.424 | −0.701 |
| $f_{Q4}/|r_{13}|$ | 1.046 | 0.636 | 1.254 | 0.541 |
| $|f_{Q2-}/f_{Q3+}|$ | 1.633 | 0.671 | 0.158 | 0.244 |
| $|f_{Q2+}/f_{Q3-}|$ | 0.661 | 0.408 | 0.540 | 0.743 |
| $n_{Q2-}/n_{Q3+}$ | 0.863 | 1.038 | 1.015 | 1.008 |
| $n_{Q2+}/n_{Q3-}$ | 0.987 | 0.988 | 1.000 | 0.539 |
| $(dn/dt)_{Q41}$ | −6.4 × 10⁻⁶ | −6.4 × 10⁻⁶ | −7.5 × 10⁻⁶ | −5.9 × 10⁻⁶ |
| $Vd_{Q41}$ | 71.718 | 71.718 | 68.525 | 81.522 |
| $\Delta Pg, F_{Q41}$ | 0.021 | 0.021 | 0.014 | 0.0346 |
| $F_{Q1}$ | −2.297 | −3.367 | −1.375 | −7.148 |

In the above embodiments, the ultra-wide-angle lens provided by the present disclosure can achieve the following optical index: (1) the filed angle 2θ>200°, (2) optical total length: TTL<23 min, (3) applicable spectral range: 400 nm~700 nm.

In summary, the present disclosure provides the ultra-wide-angle lens. Wherein, the first group mainly used for light collection and distortion correction, the second group mainly used for light convergence, the third group is used for eliminating chromatic aberration. The second group and the third group are composed of a lens with a positive refractive power and a lens with a negative refractive power. The lens with a positive refractive power of the second group, the lens with a negative refractive power of the third group have the same or similar focal length and the refractive index, the lens with a negative refractive power of the second group and the lens with a positive refractive power of the third group have the same or similar focal length and the refractive index, that can effectively reduce the aberration of the lens, reduce the influence of the tolerance, and improve the assembly rate. The fourth group plays the role of adiabatic difference, eliminating aberrations and controlling the exit angle of the chief ray. In the fourth group, the glass with negative refractive index coefficient, a low dispersion and a relative partial dispersion can be minimized the focus movement of the optical system caused by the change of the ambient temperature, effectively solve the problem of thermal drift, and can well correct the secondary spectrum, and the focal position of the monochromatic light of different wavelengths is closer, so that the lens of the present disclosure not only has reliable thermostability but also has good effect on monochromatic light in a wide range of visible light, which is beneficial to improve the resolution ability of the ultra-wide-angle lens to the objects that emit or reflect monochromatic light such as signal indicator, highway sign, etc.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. An ultra-wide-angle lens, consisting of six or seven lenses, and comprising:
   a first group with a negative refractive power, the first group comprising at least one negative refractive power lens;
   a second group with a positive refractive power, the second group consisting of two lenses, and sequentially comprising a negative refractive power lens and a positive refractive power lens, an image side surface of the negative refractive power lens of the second group being a concave surface, an object side surface and an image side surface of the positive refractive power lens of the second group each being convex surfaces;
   a third group with a positive refractive power or a negative refractive power, the third group comprising of two lenses, and comprising a positive refractive power lens and a negative refractive power lens, the positive refractive power lens of the third group and the negative refractive power lens of the third group being bonded together to form an integrated body;
   a fourth group with a positive refractive power, the fourth group comprising at least one positive refractive power lens;
   a stop, disposed between the second group and the third group; and
   a filter, disposed between the fourth group and the imaging surface;
   wherein the first group, the second group, the third group, and the fourth group are in an order from an object side to an imaging side of the ultra-wide-angle lens, the ultra-wide-angle lens satisfies the following expression:

$$0<f_{Q4}/|r_{13}|<2,$$

where $f_{Q4}$ is a focal length of the fourth group, and $r_{13}$ is a radius of curvature of an image side surface of a positive refractive power lens of the fourth group which is adjacent to the imaging surface; wherein the ultra-wide-angle lens satisfies the following expressions:

$$0<|f_{Q2-}/f_{Q3+}|<2,$$

$$0<|f_{Q2+}/f_{Q3-}|<2,$$

$$0.5<n_{Q2-}/n_{Q3+}<1.5,$$

$$0.5<n_{Q2+}/n_{Q3-}<1.5,$$

where $f_{O2-}$ is a focal length of the negative refractive power lens of the second group, $f_{O2+}$ is a focal length of the positive refractive power lens of the second group, $f_{O3+}$ is a focal length of the positive refractive power lens of the third group, $f_{O3-}$ is a focal length of the negative refractive power lens of the third group, $n_{O2-}$ is a refractive index of the negative power lens of the second group, $n_{O2-}$ is a refractive index of the positive power lens of the second group, and $n_{O3+}$ is a negative power lens of the third group:
   when $|f_{O2-}/f_{O3+}|$ is 1.633, $|f_{O2+}/f_{O3-}|$ is 0.661, $n_{O2-}/n_{O3+}$ is 0.863, $n_{O2+}/n_{O3-}$ is 0.987; when $|f_{O2-}/f_{O3+}|$ is 0.671, $|f_{O2+}/f_{O3-}|$ is 0.408, $n_{O2-}/n_{O3+}$ is 1.038, $n_{O2+}/n_{O3-}$ is 0.988; when $|f_{O2-}/f_{O3+}|$ is 0.158, $|f_{O2+}/f_{O3-}|$ is 0.540, $n_{O2-}/n_{O3+}$ is 1.015, $n_{O2+}/n_{O3-}$ is 1.000; when $|f_{O2-}/f_{O3+}|$ is 0.244, $|f_{O2+}/f_{O3-}|$ is 0.743, $n_{O2-}/n_{O3+}$ is 1.008, $n_{O2+}/n_{O3-}$ is 0.539.

2. The ultra-wide-angle lens as claimed in claim 1, wherein the at least one negative refractive power lens of the first group comprises one negative refractive power lens, whose object side surface is a convex surface while its image side surface is a concave surface.

3. The ultra-wide-angle lens as claimed in claim 1, wherein the at least one negative refractive power lens of the first group sequentially comprises a negative refractive power lens adjacent to the object side and another negative refractive power lens adjacent to the imaging surface, an object side surface of the negative refractive power lens which is adjacent to the object side is a convex surface while its image side surface is a concave surface.

4. The ultra-wide-angle lens as claimed in claim 1, wherein the at least one positive refractive power lens of the fourth group comprises one positive refractive power lens, whose object side surface and image side surface both are convex surfaces.

5. The ultra-wide-angle lens as claimed in claim 1, wherein the at least one positive refractive power lens of the fourth group sequentially comprises a positive refractive power lens adjacent to the object side and a positive refractive power lens adjacent to the imaging surface, an object side surface and an image side surface of the positive refractive power lens of the fourth group which is adjacent to the object side are concave surfaces.

6. The ultra-wide-angle lens as claimed in claim 1, wherein the ultra-wide-angle lens satisfies the following expressions:

$$0<|f\lambda 1-f\lambda 3|\leq 0.005,$$

$$0<|f\lambda 5-f\lambda 3|<0.01,$$

where fλ1 refers to a focal length of the ultra-wide-angle lens when a blue light of 435 nm is incident, fλ3 refers to a focal length of the ultra-wide-angle length when a green light of 550 nm is incident, and fλ5 refers to a focal length of the ultra-wide-angle lens when a red light of 650 nm is incident.

7. The ultra-wide-angle lens as claimed in claim 1, wherein the ultra-wide-angle lens satisfies the following expression:

$$-2<f_{Q11}/(r_1-r_2)<0,$$

where $f_{Q11}$ is a focal length of the negative refractive power lens of the first group which is adjacent to the object side, $r_1$ is a radius of curvature of an object side surface of the negative refractive power lens of the first group which is adjacent to the object side, and $r_2$ is a radius of curvature of an image surface of the negative refractive power lens of the first group which is adjacent to the object side.

8. The ultra-wide-angle lens as claimed in claim 1, wherein the ultra-wide-angle lens satisfies the following expression:

$$(dn/dt)_{Q41}<-3\times 10^{-6}/°C.,$$

where $(dn/dt)_{Q41}$ is a refractive index temperature coefficient of the positive refractive power lens of the fourth group which is adjacent to the object side.

9. The ultra-wide-angle lens as claimed in claim 1, wherein the ultra-wide-angle lens satisfies the following expressions:

$$Vd_{Q41}>60,$$

$$\Delta Pg,F_{Q41}>0.01,$$

where $V_{dQ41}$ is the abbe number of the positive refractive power lens of the fourth group which is adjacent to the object side, and $\Delta Pg,F_{Q41}$ is a deviation of relative partial dispersion from the abbe empirical formula of the positive refractive power lens of the fourth group which is adjacent to the object side.

10. The ultra-wide-angle lens as claimed in claim 1, wherein the ultra-wide-angle lens satisfies the following expression:

$$-10<f_{Q1}<0,$$

where $f_{Q1}$ is a focal length of the first group.

11. The ultra-wide-angle lens as clamed in claim 1, wherein each of the lenses in the ultra-wide-angle lens adopts glass lens.

12. The ultra-wide-angle lens as claimed in claim 1, wherein at least one lens in the ultra-wide-angle lens is aspherical lens.

13. An ultra-wide-angle lens, comprising:
a first group with a negative refractive power, the first group comprising at least one negative refractive power lens;
a second group with a positive refractive power, the second group sequentially comprising a negative refractive power lens and a positive refractive power lens, an image side surface of the negative refractive power lens of the second group being a concave surface, an object side surface and an image side surface of the positive refractive power lens of the second group being convex surfaces;
a third group with a negative refractive power, the third group comprising a positive refractive power lens and a negative refractive power lens, the positive refractive power lens of the third group and the negative refractive power lens of the third group being bonded together to form an integrated body; wherein the positive refractive power lens of the third group and the negative refractive power lens of the third group are in an order from an object side to an imaging side of the ultra-wide-angle lens; an object side surface and an image side surface of the positive refractive power lens of the third group both are convex surfaces, and an object side surface and an image side surface of the negative refractive power lens of the third group both are concave surfaces;
a fourth group with a positive refractive power, the fourth group comprising at least one positive refractive power lens;
a stop, disposed between the second group and the third group; and
a filter, disposed between the fourth group and the imaging surface;
wherein the first group, the second group, the third group, and the fourth group are in an order from an object side to an imaging surface of the ultra-wide-angle lens; and
wherein the ultra-wide-angle lens satisfies the following expression:

$$-10<f_{Q1}<0,$$

where $f_{Q1}$ is a focal length of the first group; wherein
when $|f_{O2-}/f_{O3+}|$ is 1.633, $|f_{O2+}/f_{O3-}|$ is 0.661, $n_{O2-/nO3+}$ is 0.863, $n_{O2+/nO3-}$ is 0.987;
when $|f_{O2-}/f_{O3+}|$ is 0.671, $|f_{O2+}/f_{O3-}|$ is 0.408, $n_{O2-/nO3+}$ is 1.038, $n_{O2+/nO3-}$ is 0.988;
when $|f_{O2-}/f_{O3+}|$ is 0.158, $|f_{O2+}/f_{O3-}|$ is 0.540, $n_{O2-/nO3+}$ is 1.015, $n_{O2+/nO3-}$ is 1.000;
when $|f_{O2+}/f_{O3-}|$ is 0.244, $|f_{O2-}/f_{O3+}|$ is 0.743, $n_{O2-/nO3+}$ is 1.008, $n_{O2+/nO3-}$ is 0.539;
where $f_{O2-}$ is a focal length of the negative refractive power lens of the second group, $f_{O2+}$ is a focal length of the positive refractive power lens of the second group, $f_{O3+}$ is a focal length of the positive refractive power lens of the third group, $f_{O3-}$ is a focal length of the negative refractive power lens of the third group, $n_{O2-}$ is a refractive index of the negative power lens of the second group, $n_{O2-}$ is a refractive index of the positive power lens of the second group, and $n_{O3+}$ is a refractive index of the positive power lens of the third group, $n_{O3-}$ is a refractive index of he negative power lens of the third group.

14. The ultra-wide-angle lens as claimed in claim 13, wherein the at least one negative refractive power lens of the first group sequentially comprises a negative refractive power lens adjacent to the object side and another negative refractive power lens adjacent to the imaging surface, an image side surface of the negative refractive power lens which is adjacent to the object side is a concave surface; and wherein the at least one positive refractive power lens of the fourth group comprises one positive refractive power lens, whose object side surface and image side surface both are convex surfaces.

15. An ultra-wide-angle lens, consisting of seven lenses, and sequentially comprising from an object side to an imaging side thereof:

a first group, consisting of one lens and comprising a first lens with a negative refractive power;

a second group with a positive refractive power, the second group consisting of two lenses, and sequentially comprising a second lens with a negative refractive power and a third lens with a positive refractive power, an image side surface of the second lens being a concave surface, an object side surface and an image side surface of the third lens being convex surfaces;

a third group with a positive refractive power or a negative refractive power, the third group consisting of two lenses, and comprising a positive refractive power lens and a negative refractive power lens, the positive refractive power lens of the third group and the negative refractive power lens of the third group being bonded together to form an integrated body;

a fourth group with a positive refractive power, the fourth group comprising a positive refractive power lens adjacent to the object side and a positive refractive power lens adjacent to the imaging side, an object side surface and an image side surface of the positive refractive power lens of the fourth group which is adjacent to the object side being convex surfaces;

a stop, disposed between the second group and the third group; and a filter, disposed between the fourth group and an imaging surface;

wherein the first group, the second group, the third group, and the fourth group are in an order from the object side to the imaging side of the ultra-wide-angle lens; the ultra-wide-angle lens satisfies the following expression:

$$0 < f_{O4}/|r_{13}| < 2,$$

where $f_{O4}$ is a focal length of the fourth group, and $r_{13}$ is a radius of curvature of an image side surface of a positive refractive power lens of the fourth group which is adjacent to the imaging surface; wherein when $|f_{O2-}/f_{O3+}|$ is 1.633, $|f_{O2+}/f_{O3-}|$ is 0.661, $n_{O2-}/n_{O3+}$ is 0.863, $n_{O2+}/n_{O3-}$ is 0.987;

when $|f_{O2-}/f_{O3+}|$ is 0.671, $|f_{O2+}/f_{O3-}|$ is 0.408, $n_{O2-}/n_{O3+}$ is 1.038, $n_{O2+}/n_{O3-}$ is 0.988;

when $|f_{O2-}/f_{O3+}|$ is 0.158, $|f_{O2+}/f_{O3-}|$ is 0.540, $n_{O2-}/n_{O3+}$ is 1.015, $n_{O2+}/n_{O3-}$ is 1.000;

when $|f_{O2-}/f_{O3+}|$ is 0.244, $|f_{O2+}/f_{O3-}|$ is 0.743, $n_{O2-}/n_{O3+}$ is 1.008, $n_{O2+}/n_{O3-}$ is 0.539;

where $f_{O2-}$ is a focal length of the negative refractive power lens of the second group, $f_{O2+}$ is a focal length of the positive refractive power lens of the second group, $f_{O3-}$ is a focal length of the positive refractive power lens of the third group, $f_{O3-}$ is a focal length of the negative refractive power lens of the third group, $n_{O2-}$ is a refractive index of the negative power lens of the second group, $n_{O2+}$ is a refractive index of the positive power lens of the second group, and $n_{O3+}$ is a refractive index of the positive power lens of the third group, $n_{O3-}$ is a refractive index of the negative power lens of the third group.

16. The ultra-wide-angle lens as claimed in claim 15, wherein an object side surface of the first lens is a convex surface and an image side surface of the first lens is a concave suffice, an image side surface of the second lens is a concave surface, an object side surface and an image side surface of the third lens both are convex surfaces;

wherein the positive refractive power lens of the third group and the negative refractive power lens of the third group are in an order from an object side to an imaging side of the ultra-wide-angle lens; an object side surface and an image side surface of the positive refractive power lens of the third group both are convex surfaces, and an object side surface and an image side surface of the negative refractive power lens of the third group both are concave surfaces.

* * * * *